United States Patent
Madaiah et al.

(10) Patent No.: US 9,491,041 B2
(45) Date of Patent: Nov. 8, 2016

(54) ETHERNET CHAIN PROTECTION SWITCHING

(75) Inventors: Vinod Kumar Madaiah, Bangalore (IN); Somnath Ojha, Mumbai (IN); Jishnu Aravindakshan, Palakkad (IN); Balasubramanian Krishnamoorthy, Bangalore (IN)

(73) Assignee: Tejas Networks Limited, Bangalore Karn (IN)

( * ) Notice: Subject to any disclaimer, the term of this patent is extended or adjusted under 35 U.S.C. 154(b) by 140 days.

(21) Appl. No.: 14/004,048

(22) PCT Filed: Aug. 11, 2011

(86) PCT No.: PCT/IN2011/000539
§ 371 (c)(1),
(2), (4) Date: Sep. 9, 2013

(87) PCT Pub. No.: WO2012/120528
PCT Pub. Date: Sep. 13, 2012

(65) Prior Publication Data
US 2013/0343179 A1    Dec. 26, 2013

(30) Foreign Application Priority Data
Mar. 7, 2011    (IN) .............................. 679/CHE/2011

(51) Int. Cl.
*H04L 12/24* (2006.01)
*H04L 12/751* (2013.01)
*H04L 12/437* (2006.01)

(52) U.S. Cl.
CPC ......... *H04L 41/0654* (2013.01); *H04L 12/437* (2013.01); *H04L 45/02* (2013.01)

(58) Field of Classification Search
None
See application file for complete search history.

(56) References Cited

U.S. PATENT DOCUMENTS

| | | | |
|---|---|---|---|
| 7,486,614 B2 | 2/2009 | Yu | |
| 8,031,589 B2* | 10/2011 | Guess et al. | 370/220 |
| 9,344,323 B2* | 5/2016 | Civil | H04L 41/0654 |
| 2007/0230368 A1* | 10/2007 | Shi et al. | 370/254 |

(Continued)

OTHER PUBLICATIONS

Jeon-dong Ryoo et al., : "Ethernet Ring Protection for Carrier Ethernet Networks" Communications Magazine, IEEE, Sep. 12, 2008, vol. 46, Issue 9, pp. 136-143.*

*Primary Examiner* — Mounir Moutaouakil
(74) *Attorney, Agent, or Firm* — Woodard, Emhardt, Moriarty, McNett & Henry LLP (57) ABSTRACT

The present invention relates to a protection switching method in a communication network, the communication network including plurality of communication devices forming a linear chain and at least one non-ERPS on the nodes ERPS (Ethernet Ring Protection Switching) device connecting terminal ports of the linear chain and thereby forming a ring. In one embodiment this is accomplished by instantiating ERPS on each communication device that forms a linear chain and on each non-terminal ports of the linear chain, identifying a node or link fault in the network, wherein the link or node fault is detected by Continuity Check Message (CCM), Loss of Light (LOL), Loss of Signal (LOS), Loss of periodic continuity check messages (IEEE 802.1 ag) or any other mechanisms thereof, blocking ports of the communication device in response to the detection of fault, periodically broadcasting a fault message by the blocked ports of the communication devices, wherein the message gets terminated at the ports of the communication device within the linear chain network without reaching the non-ERPS device, flushing the Media Access Control (MAC) table entry upon receipt of the fault message by all the communication device and unblocking of a root port link (RPL) of the linear for providing an alternate path to route network traffic after receipt of the fault message.

10 Claims, 7 Drawing Sheets

(56) References Cited

U.S. PATENT DOCUMENTS

| | | | |
|---|---|---|---|
| 2008/0285466 A1* | 11/2008 | Salam | H04L 41/0226 370/241.1 |
| 2009/0168647 A1* | 7/2009 | Holness | H04L 12/437 370/228 |
| 2009/0316571 A1* | 12/2009 | Rose | H04L 12/437 370/218 |
| 2010/0135154 A1* | 6/2010 | Cheung et al. | 370/223 |
| 2010/0165834 A1* | 7/2010 | Holness | H04L 45/28 370/225 |
| 2010/0287405 A1* | 11/2010 | Soon | H04L 43/0817 714/4.1 |
| 2012/0087236 A1* | 4/2012 | Desai et al. | 370/222 |
| 2013/0064071 A1* | 3/2013 | Bos | H04L 12/437 370/223 |

* cited by examiner

ETHERNET CHAIN PROTECTION SWITCHING

REFERENCE TO RELATED APPLICATIONS

The present application is a national stage of International Patent Application PCT/IN2011/000539, filed 12 Aug. 2011, which claims the benefit of India Patent Application Serial No. 679/CHE/2011, filed 7 Mar. 2011, all of which are hereby incorporated by reference.

FIELD OF THE INVENTION

The present invention is directed to the field of data communication networks. More particularly, the present invention provides a protection switching method and system of a node having communication failure in a ring, in a communication network.

BACKGROUND OF THE INVENTION

Communication networks can be built in many different network topologies, such as a ring, mesh, linear, linear chain, tree, and the like. Conventionally, network protection is provided for at layers one and below, such as through SONET, SDH, and the like. Typical protection schemes can include Automatic Protection Switching (APS), Uni-directional Path Switched Rings (UPSRs), two and four fiber Bi-directional Line Switched Rings (BLSRs), and the like. Traditionally, networks are typically not protected using ring protection schemes at layer two (e.g., Ethernet) and above. For example, Ethernet-based access and aggregation networks are typically designed in a tree structure, and thus lack network protection and has only restoration mechanism.

Modern networks, such as access and aggregation networks, are moving towards Ethernet as the universal medium. Ethernet standards are evolving towards carrier-grade performance, and equipment providers today provide various different solutions for Ethernet-based network protection. For example, layer one protection can be provided through Ethernet-over-SONET or Ethernet-over-SDH solutions. To increase the bandwidth with the Ethernet-over-SONET and Ethernet-over-SDH leads to higher cost. At layer two, various solutions have been presented, such as Rapid Spanning Tree Protocol (RSTP), and Spanning Tree Protocol (STP). The major problems with this type of path protection scheme are: (1) switching time in response to a fault is relatively slow, (2) cannot offer QoS because of in-deterministic tree; and (3) complex circuitry (4) hop-count limitation.

Another form of providing protection switching in a layer-2 network is an Ethernet Ring Protection Switching (ERPS) which is formed only of Ethernet bridges as per ITU-T G.8032v1 or v2. This network protection scheme is only restricted for bridges/switches within the chain or loop of the network.

Whenever, the network has to expand i.e. for a Metropolitan Area Network (MAN), the protection scheme has to include one or more aggregation devices for data transfer. The standard ITU-T G.8032 is for Layer 2 Ethernet device. It is also possible to protect ring protection work or ERPS for Non-ERPS devices by appropriately setting a Remote Destination Indication (RDI) bit in the Continuity Check Message (CCM) generated from one of the node and transmits the same via the non-ERPS device or through the non-ERPS device or over a disjoint communication channel and also blocking the port of the node towards the non-ERPS device upon receipt of the fault notification and transmitting signal fail notification message on both the ports in the ring that connects non-ERPS devices. But these setting leads to certain limitations, primarily ERPS will form loop if dual homed with VPLS network and also need extra functional support to avoid it, and secondly ERPS message has to pass through IP/MPLS cloud, where the IP/MPLS nodes do not understand these messages and may discard the same (non-deterministic).

For the reasons stated above, which will become apparent to those skilled in the art upon reading and understanding the specification, there is a need in the art for a protection switching method in a communication network, where the communication network having one or more of communication devices forming a linear chain and at least one non-Ethernet Ring Protection Switching (ERPS) device connecting terminal ports of the linear chain and thereby forming a ring.

SUMMARY OF THE INVENTION

An aspect of the present invention is to address at least the above-mentioned problems and/or disadvantages and to provide at least the advantages described below.

Accordingly, an aspect of the present invention is to provide a protection switching method in a communication network, the communication network including plurality of communication devices forming a linear chain and at least one non-ERPS (Ethernet Ring Protection Switching) device connecting at least two terminal ports of the linear chain and thereby forming a ring, the method comprising: instantiating ERPS on each communication device that forms a linear chain and on each non-terminal ports of the linear chain, identifying a node or link fault in the network, wherein the link or node fault is detected by Continuity Check Message (CCM), Loss of Light (LOL), Loss of Signal (LOS), Loss of periodic continuity check messages (IEEE 802.1ag) or any other mechanisms thereof, blocking ports of the communication device in response to the detection of fault, periodically broadcasting a fault message by the blocked ports of the communication devices, wherein the message gets terminated at the ports of the communication device within the linear chain network without reaching the non-ERPS device, flushing the Media Access Control (MAC) table entry upon receipt of the fault message by all the communication device and unblocking of a root port link (RPL) of the linear chain or toggling of the communication device attached to the linear chain, for providing an alternate path to route network traffic after receipt of the fault message.

In accordance with another aspect of the present invention provide a protection switching method in a layer-2 communication network, the communication network including a plurality of communication device and at least one non-ERPS (Ethernet Ring Protection Switching) device, the method comprising: identifying a fault in the network in absence of Continuity Check Message (CCM) within a particular time period, blocking ports of the communication device in response to the detection of fault, broadcasting a signal fail message (R-APS (SF)) by the blocked ports of the communication device, wherein the message gets terminated at the ports of the communication device in the network without reaching the non-ERPS device, flushing the MAC table entry upon receipt of the message (R-APS (SF)) by all the communication device on the linear ring, and unblocking of a root port for providing an alternate path to route network traffic after receipt of the signal fail message.

In yet another aspect of the present invention provide a protection switching method in a layer-3 communication network, the communication network including a plurality of communication device and at least one non-ERPS (Ethernet Ring Protection Switching) device, the method comprising; identifying a fault in the network in absence of Continuity Check Message (CCM) within a particular time period, blocking ports of the communication device in response to the detection of fault, broadcasting a flush message (R-APS (FLUSH)) by the blocked ports of the communication device, flushing the MAC table entry upon receipt of the flush message (R-APS (FLUSH)) by all the communication device and toggling the port on the communication device towards the client non-ERPS device to route network traffic.

In yet another aspect of the present invention provide a protection switching system in a communication network, the communication network including plurality of communication device and at least one non-ERPS (Ethernet Ring Protection Switching) device connecting at least two terminal ports of the linear chain and thereby forming a ring, the system comprising: a plurality of communication devices interconnected in a ring topology, at least one non-ERPS device within the network; and a network channel connected to each of the communication device for transmitting and receiving Continuity Check Message (CCMs) or other types of message exchanges signifying channel being fault-less, wherein each communication device is configured for identifying a fault in the network, blocking ports of the communication device in response to the detection of fault broadcasting RAPS (Fault) message by the blocked ports of the communicator devices, wherein the message gets terminated at the ports of the nodes within the network without reaching the non-ERPS device, flushing the MAC table entry upon receipt of the RAPS (Fault) message by all the communication device, and unblocking of a root port link of the linear chain or toggling of the port on the communication device attached to the linear chain, for providing an alternate path to route network traffic after receipt of the RAPS (Fault) message.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
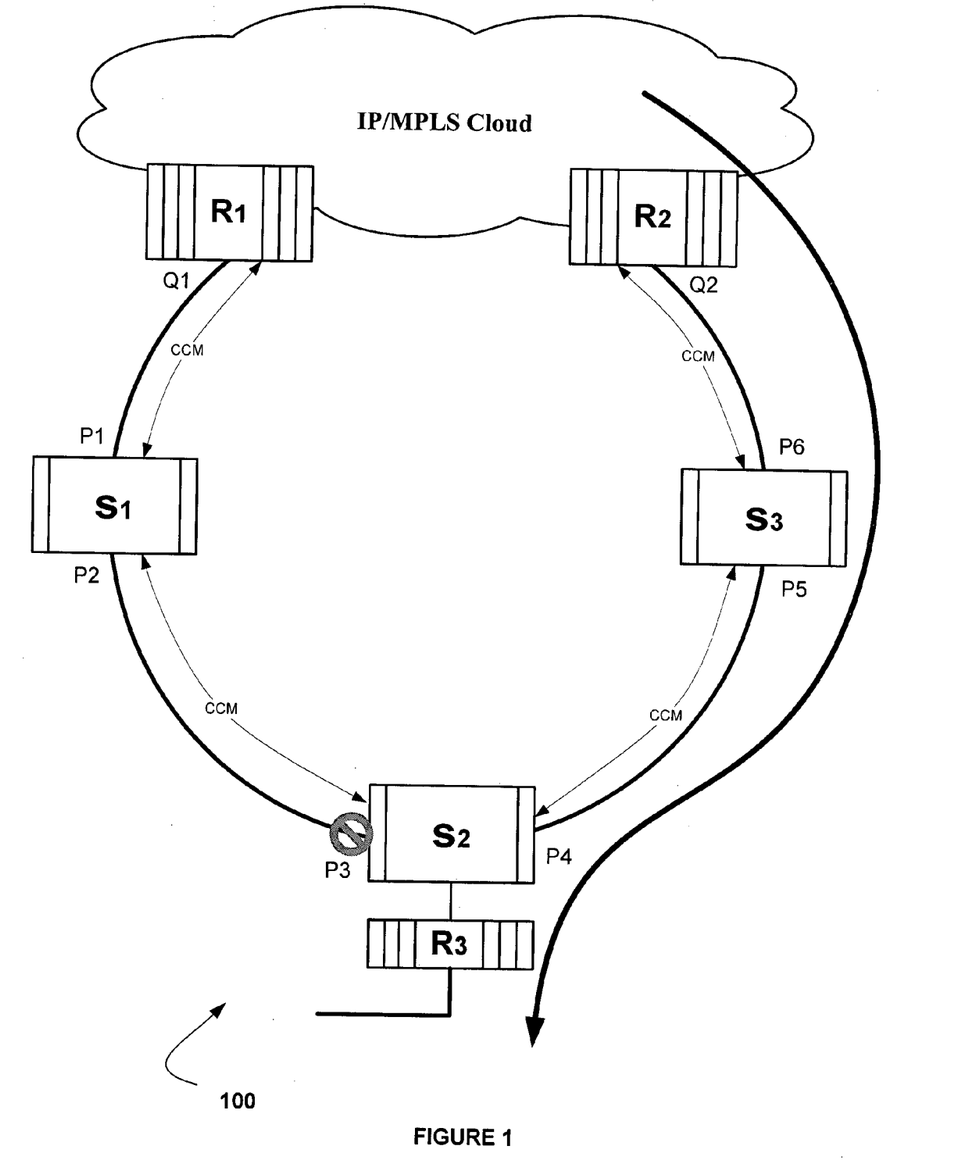
FIG. 1 shows an example of Ethernet Ring Protected Switching (ERPS) network in the Full Ring mode in normal operation for layer-2 traffic.

FIG. 1 shows an example topology of an Ethernet Ring Protected Switching (ERPS) network in the Full Ring mode in normal operation for layer-2 traffic. In FIG. 1, the ERPS system 100 includes EPRS nodes like switches i.e. S1, S2, S3 and non-ERPS devices like routers i.e. routers R1, R2 and R3. The switches S1, S2, and S3 having ports P1, P2, P3, P4, P5 and P6. The non-ERPS device may be or may include an IP/MPLS router, VPLS, HVPLS, ATM switch, Frame Relay, Ethernet Switch, RPR switch and thereof. The communication channel between the ERPS nodes and the non-ERPS devices is a uni-directional link or a bi-directional link or both.

The ERPS system 100 operates on a ring network. One node on the ring network is designated as the Root or master node. Each node will have a primary port and a secondary port, both known to be able to send control traffic to the master node. Under normal operation only the primary port on the master node is used to avoid loops. It uses control messages called Ring Automatic Protection Switching (RAPS) message to coordinate the activities of switching on/off the RPL link.

As shown in figure during normal operation for a layer-2 traffic (e.g. P2P E-Line, PPPoE, etc), switch S2 is Root Port Link (RPL) owner and link P2-P3 is a RPL. ERPS block is placed on port P3. Continuity Check Message is assumed to be the fault monitoring mechanism between all the adjacent ports. Traffic from R3 will flow to R2 because of block on port P3. Layer-2 data traffic and corresponding ERPS control traffic have different VLAN.

Figure 2:
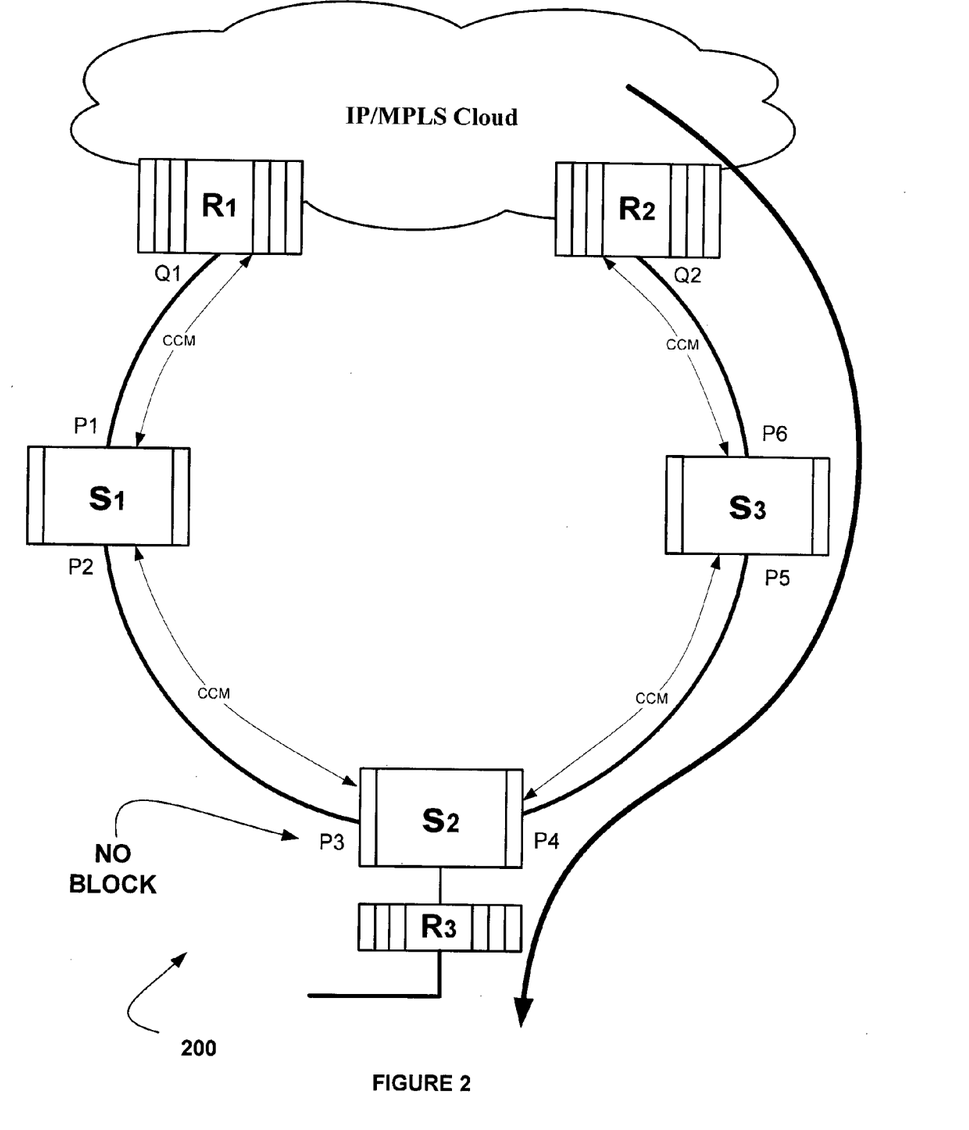
FIG. 2 shows an example of Ethernet Ring Protected Switching (ERPS) network in the Full Ring mode in normal operation for layer-3 traffic.

FIG. 2 shows an example topology of Ethernet Ring Protected Switching (ERPS) network in the Full Ring mode in normal operation for layer-3 traffic. In FIG. 2, the ERPS system 200 includes EPRS nodes like switches i.e. S1, S2, S3 and non-ERPS devices like routers i.e. routers R1, R2 and R3. The switches S1, S2, and S3 having ports P1, P2, P3, P4, P5 and P6. The non-ERPS device may be or may include an IP/MPLS router, VPLS, HVPLS, ATM switch, Frame Relay, Ethernet Switch, and RPR switch. The communication channel between the ERPS nodes and the non-ERPS devices is a uni-directional link or a bi-directional link or both.

As shown in figure during normal operation for a layer-3 traffic (e.g. IPTV, L3VPN, etc), the Continuity Check Message (CCM) is assumed to be fault-monitoring mechanism. For the layer-3 traffic, there is no ERPS block. Layer-3 traffic from R3 will flow to R2 due to routing entries on R3. Layer-3 data traffic and corresponding ERPS control traffic have different VLAN.

Figure 3:
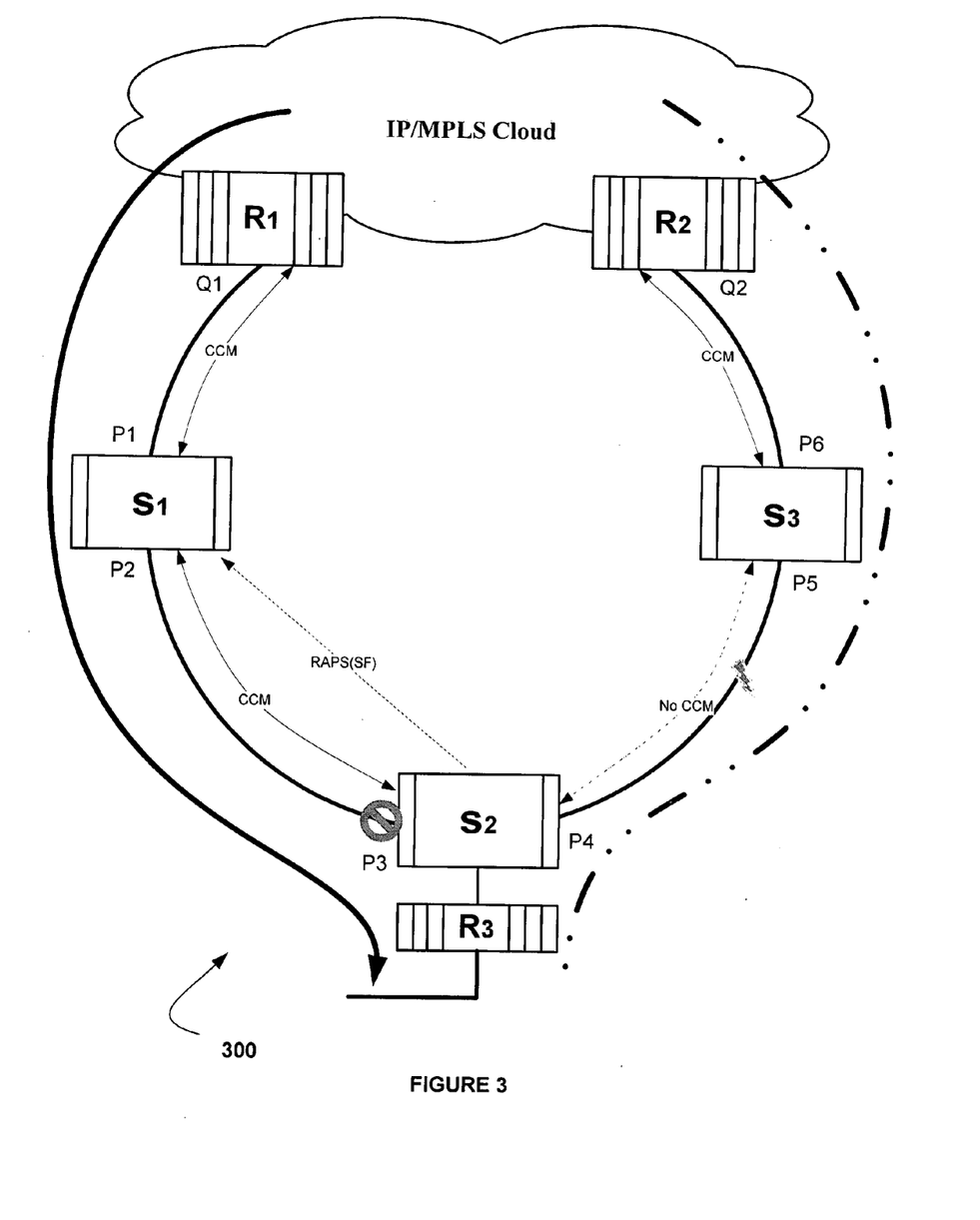
FIG. 3 shows the protection and restoration operation between any two ERPS nodes for layer-2 traffic using Ethernet Chain Protection Switching (ECPS) mechanism according to one embodiment of the invention.

FIG. 3 shows the protection and restoration operation between any two ERPS nodes for layer-2 traffic using Ethernet Chain Protection Switching (ECPS) mechanism according to one embodiment of the invention. Ethernet Chain Protection Switching (ECPS) is an optimization over Ethernet Ring Protection Switching (ERPS). In the present example embodiment, the switches S1, S2 and S3 form a ECPS with participating ports P1, P2, P3, P4, P5 and P6, where ports P2, P3, P4 and P5 are ERPS compliant ports. The functions of these ports are same as in EPRS (ITU-T G.8032) for layer-2 traffic, where ports do not put block for layer-3 traffic. Whereas, ports P1 and P6 are special or enhanced ERPS ports, these ports monitor the link shared with non-ERPS nodes and also they interoperate with ports Q1 and Q2.

Referring now to FIG. 3 which illustrates protection operations by ECPS when a fault has occurred between two of the network nodes in the system. Whether under fault or no fault scenario nodes will continue to exchange CCMs with adjacent nodes. Failure is detected when a node fails to receive CCMs from the adjacent nodes. Here in the system 300, the failure in the link is between the nodes S2 and S3 i.e. the CCM sent by node S2 to S3 is not received and vice versa. Fault between the nodes can also be detected using Loss of light or Loss of signal (LOS) mechanism where adjacent ports monitor the status of the peer laser or electrical power as per ITU-T G.775 Clause 4. It is also possible to find a fault in a network by a protocol by which the peer ports negotiate the port speed as per IEEE 802.3. Within ECPS all ports follow same monitoring mechanism.

Fault Between Any Two ERPS Nodes
Protection Operation For Layer-2 Traffic

In an example protection operation, fault is between nodes S2 and S3 i.e. fault happens between ports P4 and P5. Absence of three consecutive CCMs, i.e. within 30 ms, will act as a trigger to blocking of ports P4 and P5. Ports P4 and P5 will broadcast Ring Automatic Protection Switching (Signal Fail), RAPS (SF), message. Upon receipt of RAPS (SF), all nodes (i.e. S1, S2 and S3) forming ECPS will flush the MAC table entries; root/owner will unblock P3. Traffic from R3 will flow to R1.

Restoration Operation For Layer-2 Traffic

Fault recovers between P4 and P5. So, CCM is received on P4 and P5. P4 and P5 will wait for a predetermined time period called guard time, upon the expiry of the same they will broadcast RAPS (No Request) i.e., RAPS (NR). Upon receipt of RAPS (NR), root waits for wait-to-restore time and then blocks P3. After blocking P3, root will broadcast RAPS (No Request, Root Blocked), i.e., RAPS (NR, RB), intimating all bridges that block is in place. Upon receipt of RAPS (NR, RB) all bridges will flush the MAC table entries. Ports P4 and P5 will unblock the ports. Traffic gets restored on the original path.

Figure 4:
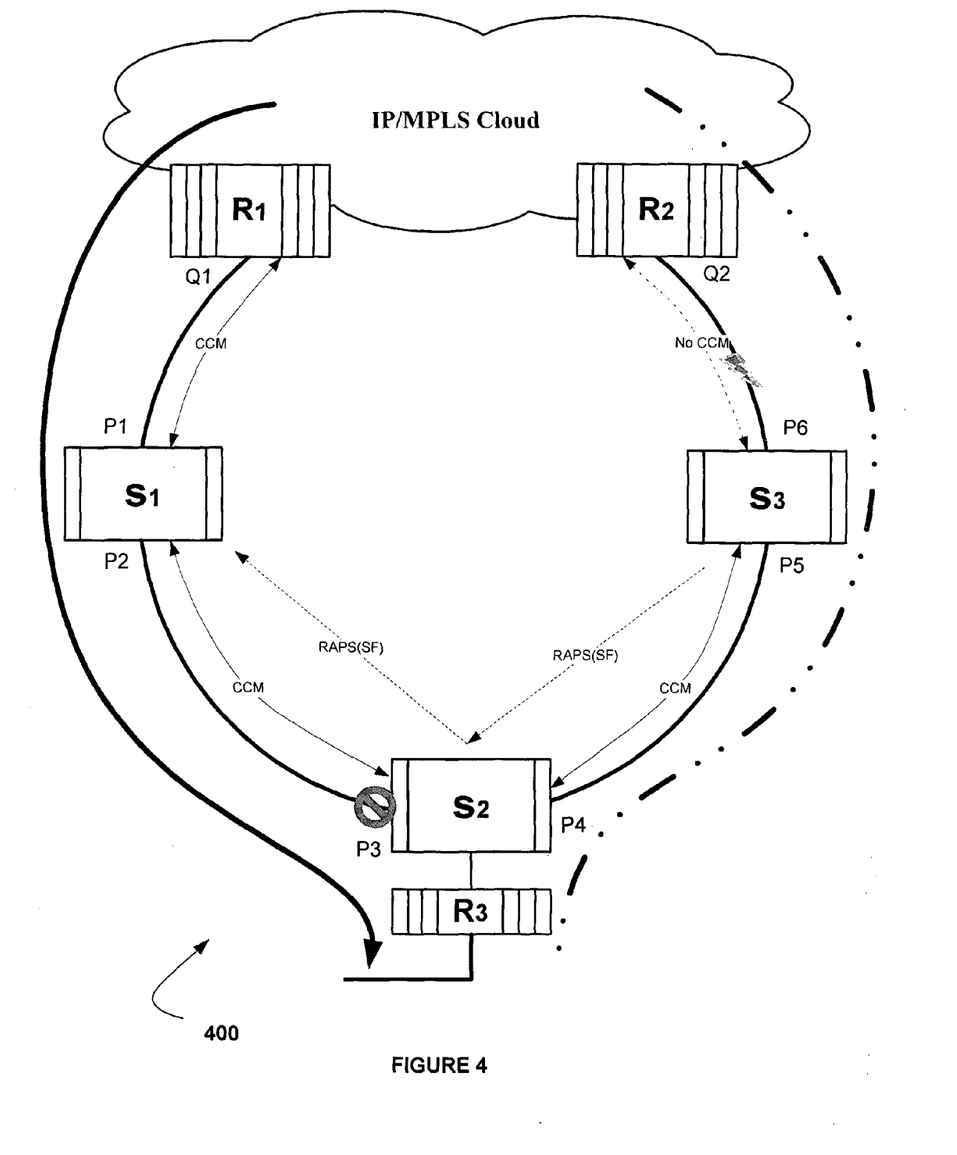
FIG. 4 shows the protection and restoration operation between at least one ERPS node and a non-ERPS node for a layer-2 traffic using Ethernet Chain Protection Switching (ECPS) mechanism according to one embodiment of the invention.

FIG. 4 shows the protection and restoration operation between an ERPS node and a non-ERPS node for a layer-2 traffic using Ethernet Chain Protection Switching (ECPS) mechanism according to one embodiment of the invention.

Fault Between ERPS Node and a Non-ERPS Node
Protection Operation For Layer-2 Traffic Fault happens between P6 and Q2. Absence of three consecutive CCMs, within 30 ms, will act as a trigger to blocking of port P6. Port Q2 is not blocked. Port P6 will broadcast RAPS (SF). Upon receipt of RAPS (SF), all bridges forming ECPS will flush the MAC table entries; root will unblock p3. Traffic from R3 will flow to R1.

Restoration Operation For Layer-2 Traffic

Fault recovers between P6 and Q2. So, CCM is received on P6 and Q2. P6 will wait for a guard time, upon whose expiry it will broadcast RAPS (NR). Upon receipt of RAPS (NR) root waits for wait-to-restore time and then unblocks P3. After unblocking P3, root will broadcast RAPS (NR, RB). Upon receipt of RAPS (NR, RB) all bridges will flush the MAC table entries. Port P6 will unblock the port. Traffic gets restored on the original path.

Figure 5:
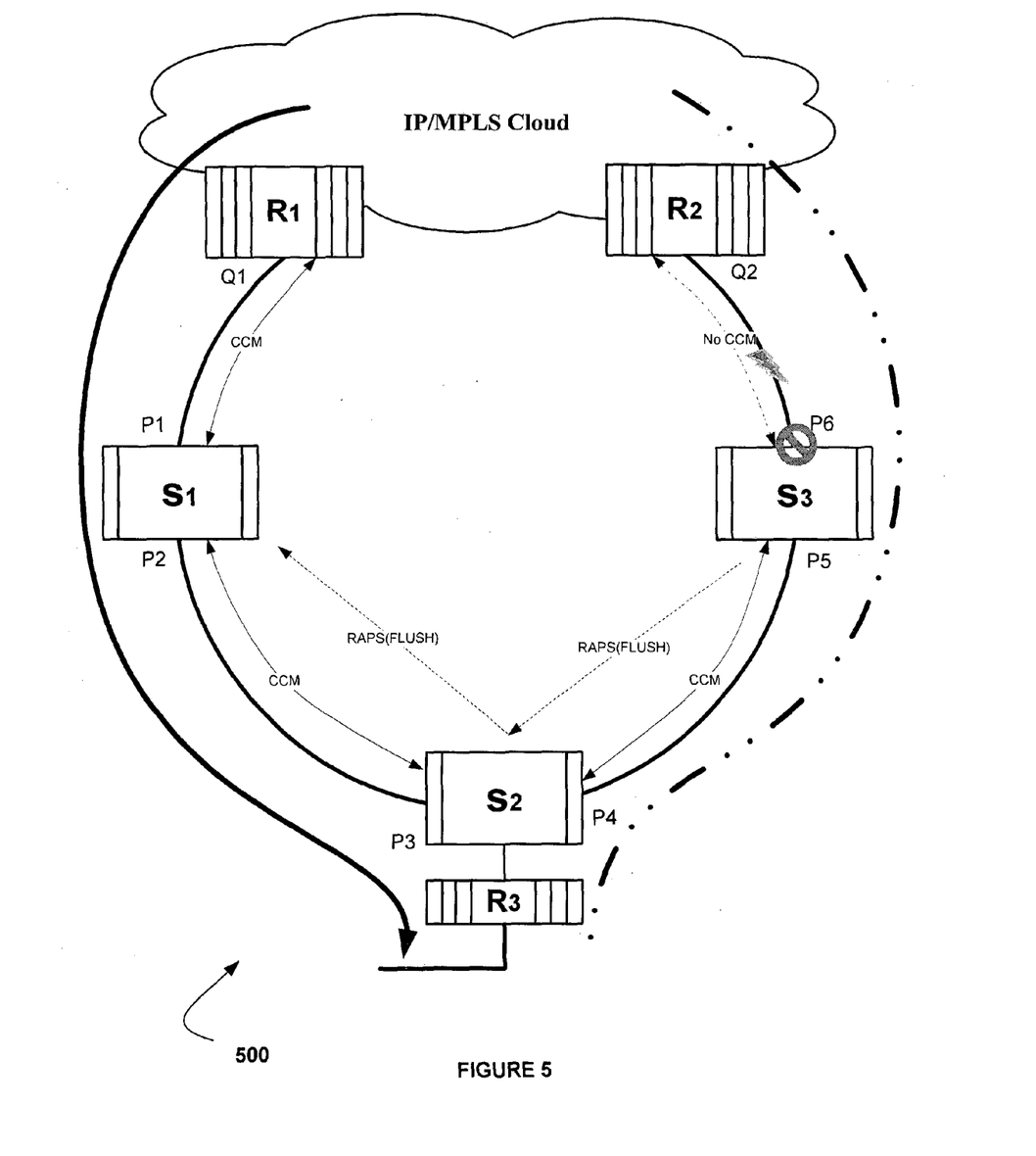
FIG. 5 shows the protection and restoration operation between at least one ERPS node and a non-ERPS node for a layer-3 traffic using Ethernet Chain Protection Switching (ECPS) mechanism according to one embodiment of the invention.

FIG. 5 shows the protection and restoration operation between at least one ERPS node and a non-ERPS node for a layer-3 traffic using Ethernet Chain Protection Switching (ECPS) mechanism according to one embodiment of the invention.

Protection Operation For Layer-3 Traffic

Layer-3 traffic is isolated from Layer-2 using VLAN. There won't be ERPS owner and RPL-block for Layer-3 traffic. Fault happens between P6 and Q2. Absence of three consecutive CCMs, within 30 ms, will act as a trigger to blocking of port P6. Port Q2 is not blocked. Port P6 will broadcast explicit flush message, RAPS (Flush). Upon receipt of RAPS (Flush), all nodes forming ECPS will flush the MAC table entries; Node S2 will toggle port towards R3 following which R3 will choose alternate IP next hop address and the corresponding MAC address for routing the Layer-3 traffic. The toggle port function is used for only layer-3 traffic. Port toggling is a process of creating artificial loss of signal or light or connectivity fault. (i) Laser or power is switched off or CCM is stopped for predetermined time, called soak time, on the port towards access routers (R3), and (ii) soak-time is the time following which router (R3) declares non-reach-ability of primary aggregation router (R2) and triggers route change to secondary router (R1) using protocol or pre-provisioned alternate next hop IP address. The switch/node toggles the port upon receipt of explicit flush, RAPS (Flush) message are per IUT-T G.8032 (ERPS).

Restoration Operation For Layer-3 Traffic

Fault recovers between P6 and Q2. So, CCM is received on P6 and Q2. P6 will wait for a guard time, upon whose expiry it will broadcast RAPS (Flush) and unblock port p6. Upon receipt of RAPS (Flush), S2 will toggle port towards R3. Following this, traffic will restore on the primary path towards R2.

In the above protection and restoration process, the topology message can be sent immediately after fault or after restoration depending on the necessity. Ports P1 and P6 will exchange topology discovery message with each other, which has the one or more fields that every traversed port need to fill, including P1 and P6. i.e. the fields includes (Sequence/order no. of port | MAC address of traversed port | IP address to which origin port is connected | port number | is it root port? | VLAN ranges | L2 VLANs | Data VID | Control VID). Application of the topology discovery message may be for trouble shooting, fault correction, verification of configuration, root port state etc.

Figure 6:
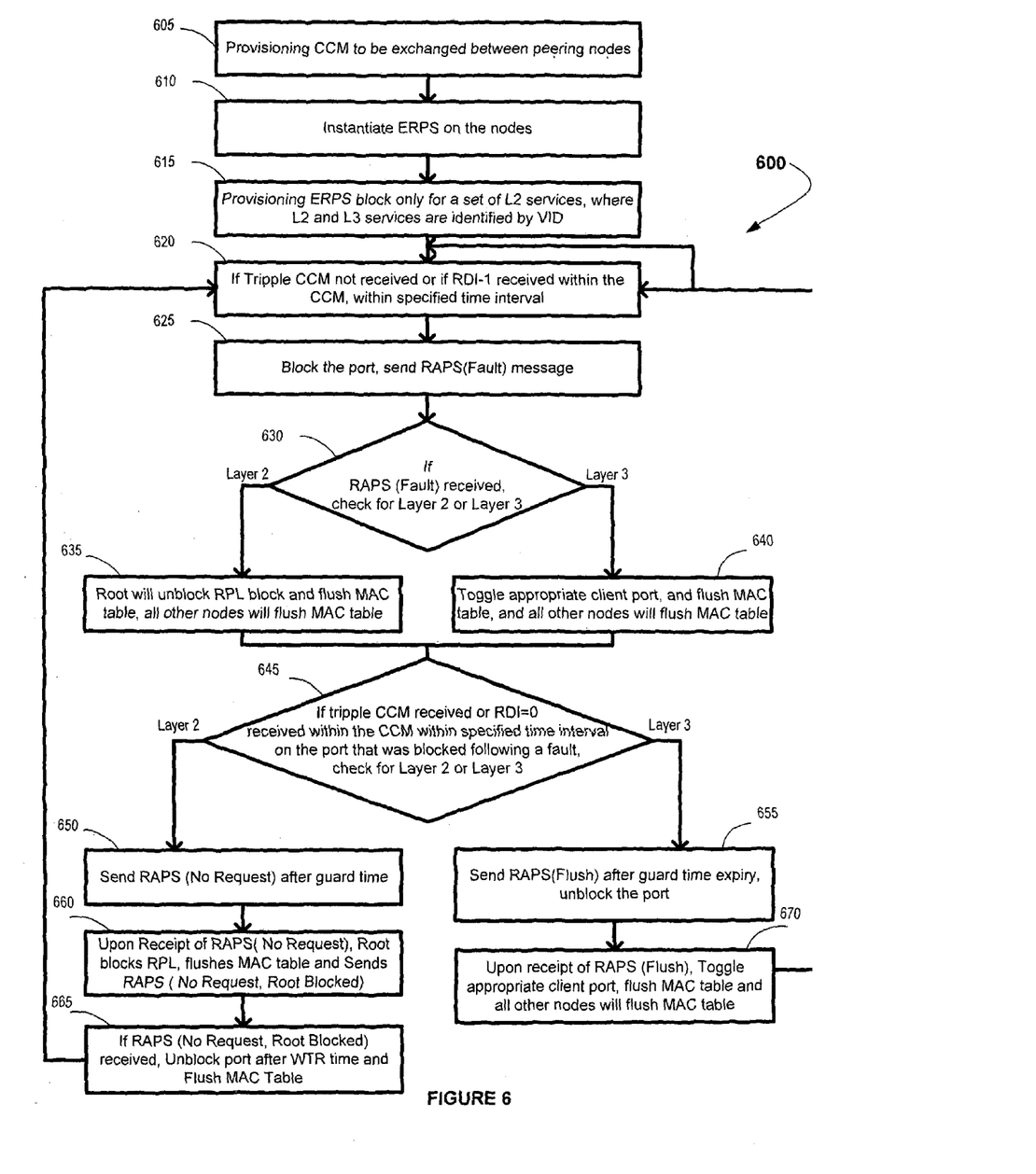
FIG. 6 is a state diagram illustrating operation of the protection mechanism using Ethernet Chain Protection Switching (ECPS) for both layer-2 and layer-3 traffic in accordance with one embodiment of the present invention.

FIG. 6 is a state diagram illustrating operation of the protection mechanism using Ethernet Chain Protection Switching (ECPS) for both layer-2 and layer-3 traffic in accordance with one embodiment of the present invention. At least some part of the method may be implemented as a computer program stored on a computer-readable medium, such as firmware, for execution by a processor. Referring now to FIG. 6, there is illustrated a protection switching method 600 in a communication network, where the communication network includes one or more communication devices forming a linear chain and one or more non-Ethernet Ring Protection Switching (ERPS) device connecting terminal ports of the linear chain and thereby forming a ring.

At step 605, the method continuously checks for a fault or at no fault scenario all the nodes are provisioned to exchange CCMs with adjacent nodes. The CCM includes trail of frames or packets and transceiving of the CCM between the communication devices without any modification in the function of the non-ERPS device.

At step 610, the method instantiates Ethernet Ring Protection Switching (ERPS) on each node that forms a linear chain and on each non-terminal ports of the node. Further, the method at step 615 provisions ERPS block only for a set of Layer-2 services, where Layer-2 and Layer-3 services are identified by VID.

The method at step 620, checks for Continuity Check Message (CCM). The method identify a node or link fault in the network, when the link or node fault is detected by failure to receive Continuity Check Message (CCM) in a predetermined time period, Loss of Light (LOL), Loss of Signal (LOS), Loss of periodic continuity check messages (IEEE 802.1ag) or any other mechanisms thereof. Also in step 620, the method further checks whether Remote Destination Indication is set or not i.e. RDI=1 within the CCM, thereby blocking the port and broadcast the RAPS (Fault) message. The RAPS (Fault) message is identified by the ERPS nodes. They consider for layer-2 traffic, the RAPS (Fault) message as a RAPS (Signal Fail) message and for layer-3 traffic, the RAPS (Fault) message is considered as a RAPS (Flush) message.

If triple CCM not received within Specified Interval, then block the port at step 625; send Ring Automatic Protection Switching (RAPS (Fault)). Where RAPS (Fault) is one of RAPS (SF) or RAPS (Flush) or any other equivalent fault messages. The RAPS (Fault) message will be broadcast periodically by the blocked ports of the node, wherein the message gets terminated at the ports of the nodes within the network without reaching the non-ERPS device. The termination of message without reaching the non-ERPS device is carried out by enhanced ERPS ports of the communication devices adjacent to the non-ERPS device.

At step 630, the method checks whether RAPS (Fault) received, then each nodes upon receipt of the fault message flushes the Media Access Control (MAC) table entry. Further, the method unblocks the root port link (RPL) at step 635.

At step 640, the method toggles the non-ERPS node, and flush MAC table, and all other nodes will flush MAC table, for providing an alternate path to route network traffic after receipt of the fault message.

At step 645, the method further checks if Light, Signal or CCM is received on the port of the communication device that was blocked following a fault. Then, the method broadcast RAPS (No Request) for layer 2 network, and RAPS (Flush) for layer 3 network after guard time expiry, at step 650 and step 655.

At step 660, the method blocks Root Port Link (RPL) and flushes MAC table and Sends RAPS (No Request, Root Blocked) to other nodes.

At step 665, the method checks for the RAPS (No Request, Root Blocked) message is received or not. If yes, Flushing the MAC Table, the method again goes back to step 620 for checking whether the nodes are receiving CCM in a predetermined time period If the CCMs are not received within Specified Interval, then again block the port, send RAPS (Fault) to other nodes.

At step 670, the method upon receipt of RAPS (Flush) message, Toggle appropriate client port, flush MAC table and all other nodes will flush MAC table.

The Ethernet Chain Protection Switching works on the rule of thumb logic i.e. put block on ECPS if there is layer-2 data loop between the dual homed nodes, else do not put block. The dual homed node may be or may include IP/MPLS, VPLS, HVPLS, PBB (IEEE 802.1ah), Q-in-Q (IEEE 802.1ad), IEEE 802.1Q, ATM, FR etc.

Figure 7:
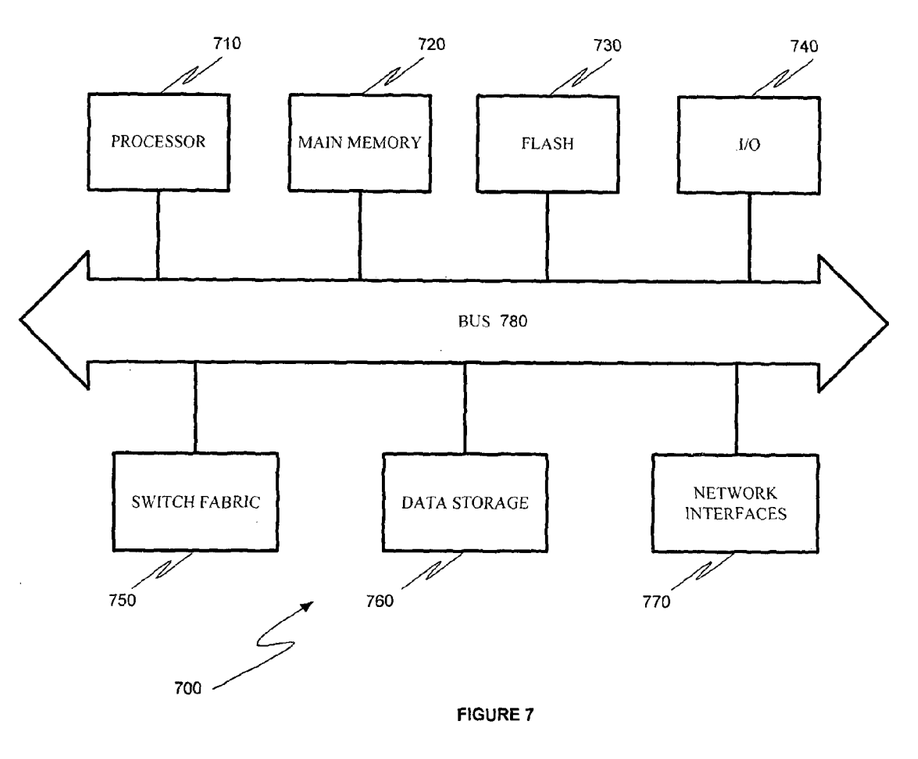
FIG. 7 illustrates one embodiment of a suitable computing environment in which certain aspects of the invention illustrated in FIGS. 1-6 may be practiced.

In the illustrated embodiment of FIG. 7, the protection switching method in a communication network, the communication network including plurality of communication devices forming a linear chain and at least one non-Ethernet Ring Protection Switching (ERPS) device connecting terminal ports of the linear chain and thereby forming a ring, according to the present invention as discussed above may be implemented as a series of software routines run by computer system 700 of FIG. 7. These software routines comprise a plurality or series of instructions to be executed by a processing system in a hardware system, such as processor 710 of FIG. 7. Initially, the series of instructions are stored on a data storage device 760, memory 720 or flash 730. It is to be appreciated that the series of instructions can be stored using any conventional computer-readable or machine-accessible storage medium, such as a diskette, CD-ROM, magnetic tape, DVD, ROM, etc. It is also to be appreciated that the series of instructions need not be stored locally, and could be stored on a propagated data signal received from a remote storage device, such as a server on a network, via a network/communication interface 770. The instructions are copied from the storage device 760, such as mass storage, or from the propagated data signal into a memory 720 and then accessed and executed by processor 710.

In alternate embodiments, the present invention is implemented in discrete hardware or firmware. For example, one or more application specific integrated circuits (ASICs) could be programmed with the above-described functions of the present invention.

Accordingly, a method and system is described in which a protection switching prevents loops in a layer-2 and layer-3 ring network. From the foregoing description, those skilled in the art will recognize that many other variations of the present invention are possible. In particular, while the present invention has been described as being implemented in a metropolitan area network comprising multiple nodes or switches, it should be noted that some of the logic described herein may be distributed in other components of a network or implemented in a network of different scope such as a local area network without departing from the scope of the present invention.

FIGS. 1-7 are merely representational and are not drawn to scale. Certain portions thereof may be exaggerated, while others may be minimized. FIGS. 1-7 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. For example, flushing MAC table could be done before port-blocking, after port-blocking or parallely with port-blocking. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

We claim:

1. A protection switching method in a communication network, the communication network including plurality of Ethernet Ring Protection Switching (ERPS) communication devices and at least one non-ERPS communication device forming a linear chain connecting at least two terminal ports of the linear chain and thereby forming a ring, the method comprising:
   instantiating ERPS on each communication device that forms a linear chain and on each non-terminal port of the linear chain;
   identifying a node or link fault in the network, wherein the link or node fault is detected by Continuity Check Message (CCM), Loss of Light (LOL), Loss of Signal (LOS), Loss of periodic continuity check messages (IEEE 802.1ag) or any other mechanisms thereof;
   blocking one or more blocked ports of the communication device when a node or link fault in the network is identified;
   checking if Light, Signal or CCM is received on the port of the communication device that was blocked following a fault, to broadcast RAPS (No Request) for layer 2 network and RAPS (Flush) for layer 3 network after guard time expiry;
   periodically broadcasting a fault message by the one or more blocked ports of the communication devices, wherein the message gets terminated at the ports of the communication device within the linear chain network without reaching the non-ERPS device;
   flushing a Media Access Control (MAC) table entry of each communication device when each communication device receives the fault message; and
   unblocking of a root port link (RPL) of the linear chain or toggling of the communication device attached to the linear chain, for providing an alternate path to route network traffic after receipt of the fault message.

2. The protection switching method as claimed in claim 1, wherein the broadcasting a fault message includes Ring Automatic Protection Switching-Signal Fail (RAPS (SF)) message and Ring Automatic Protection Switching Explicit Flush (RAPS (Flush)) message, wherein the RAPS (SF) message is sent for layer 2 network and RAPS (Flush) message is sent for layer 3 network.

3. The protection switching method as claimed in claim 1, wherein the checking further includes:
   blocking RPL on receipt of RAPS (Request) message for layer 2 network; and
   toggling communication device for duration, soak time, on receipt of RAPS (Flush) message for layer 3 network.

4. The protection switching method as claimed in claim 1 wherein a message is terminated without reaching the non-ERPS device, wherein termination of the message is carried out by enhanced ERPS ports of the communication devices on the linear chain that is adjacent to the non-ERPS device.

5. The protection switching method as claimed in claim 1 wherein the CCM includes trail of frames or packets and transceiving of the CCM between the communication devices without any functional modification to the non-ERPS device.

6. The protection switching method or system as claimed in claim 1 wherein the communication network establishing a communication channel between the communication device and the non-ERPS device is a uni-directional link or a bi-directional link, wherein the non-ERPS device includes an IP/MPLS router, ATM switch, Frame Relay, Ethernet Switch, and RPR switch.

7. A protection switching method in a layer-3 communication network, the communication network including a plurality of Ethernet Ring Protection Switching (ERPS) communication devices and at least one non-ERPS communication device, the method comprising:
- identifying a fault in the network in absence of Continuity Check Message (CCM) within a particular time period;
- blocking one or more blocked ports of the communication device when a fault in the network is identified;
- broadcasting a flush message (R-APS (FLUSH)) by the one or more blocked ports of the communication device;
- flushing a MAC table entry of each communication device when each communication device receives a flush message (R-APS (FLUSH)); and
- toggling a toggle port on the communication device towards the client non-ERPS device to route network traffic.

8. The protection switching method as claimed in claim 7 wherein a message is terminated without reaching the non-ERPS device, wherein termination of the message is carried out by enhanced ERPS ports of the communication devices on the linear chain that is adjacent to the non-ERPS device.

9. The protection switching method as claimed in claim 7 wherein the CCM includes trail of frames or packets and transceiving of the CCM between the communication devices without any functional modification to the non-ERPS device.

10. The protection switching method or system as claimed in claim 7 wherein the communication network establishing a communication channel between the communication device and the non-ERPS device is a uni-directional link or a bi-directional link, wherein the non-ERPS device includes an IP/MPLS router, ATM switch, Frame Relay, Ethernet Switch, and RPR switch.

* * * * *